United States Patent [19]

Sagawa et al.

[11] Patent Number: 5,245,482
[45] Date of Patent: Sep. 14, 1993

[54] MAGNETIC RECORDING/REPRODUCING APPARATUS WITH SKEW CORRECTION

[75] Inventors: Satoru Sagawa, Kashiwa; Takayoshi Yamaguchi, Nagareyama, both of Japan

[73] Assignee: Sharp Kabushiki Kaisha, Osaka, Japan

[21] Appl. No.: 638,313

[22] Filed: Jan. 7, 1991

[30] Foreign Application Priority Data

Jan. 17, 1990 [JP] Japan ..................... 2-9068

[51] Int. Cl.$^5$ ............................................. H04N 5/78
[52] U.S. Cl. ..................... 360/38.1; 360/64; 358/336
[58] Field of Search ............ 360/64, 38.1, 27, 70; 358/336

[56] References Cited

U.S. PATENT DOCUMENTS

| 4,120,007 | 10/1978 | Sato | 360/64 |
| 4,238,777 | 12/1980 | Okada et al. | 360/38 |
| 4,287,529 | 9/1981 | Tatami et al. | 360/38.1 X |
| 4,489,354 | 12/1984 | Dann | 360/64 |
| 4,752,839 | 6/1988 | Lovely | 360/64 X |
| 4,890,169 | 12/1989 | Kobayashi et al. | 360/38.1 X |

FOREIGN PATENT DOCUMENTS

| 0262320 | 7/1987 | European Pat. Off. |
| 0396362 | 11/1990 | European Pat. Off. |
| 60-217773 | 10/1985 | Japan |
| 2086177 | 9/1981 | United Kingdom |

OTHER PUBLICATIONS

"Video Signal Processing for 1" Cassette Hi-Vision VTR" ITEJ Technical Report vol. 13, No. 50, pp. 7-9 VIR '89-13 (Oct. 1989).

Primary Examiner—Andrew L. Sniezek

[57] ABSTRACT

A magnetic recording/reproducing apparatus includes a plurality of heads attached on a rotary drum, a driver for driving the heads and a tape, head switching circuitry for producing one video signal by switching video signals picked up by the plurality of heads, video signal processing circuitry for processing the video signal produced by the head switching circuitry, and head switching point control circuitry for controlling the head switching circuitry so that the point of the head switching by the head switching circuit is included in the horizontal blanking period of the video signal. The head switching is performed within the horizontal blanking period of the video signal, and therefore no skew due to the head switching is generated in the reproduced video image.

5 Claims, 5 Drawing Sheets

HEAD SWITCHING POINT

MAGNETIC RECORDING/REPRODUCING APPARATUS WITH SKEW CORRECTION

BACKGROUND OF THE INVENTION

1. Field of the Invention

The present invention relates to a magnetic recording/reproducing apparatus such as a VTR (Video Tape Recorder), and in particular, to a technique for correcting a distortion called a skew on a picture generated by switching the heads, when scanning a magnetic tape helically with a plurality of heads.

2. Description of the Related Art

A VTR of rotary a 2-head helical scan system reproduces a signal stored on a magnetic tape utilizing the two heads provided on the circumference of a rotary drum. The two heads alternately scan the magnetic tape and pick up the recorded video signals. There exist discontinuation in the video signals reproduced by each of the heads. However, the discontinuous parts are removed from the video signals by connecting the video signals reproduced with the two heads by means of an operation called head switching.

FIG. 1 is a timing diagram of the head switching of a VTR of rotary 2-head helical scan system. Referring to FIG. 1 (a), when the head switching pulse is at its high level, a video signal picked up with the first head is employed. When the head switching pulse is at its low level, a video signal picked up with the second head is employed. The point at which the head switching pulse changes its level from the high level to the low level, (i.e. the point in which the video signal is switched from the one picked up with the first head to the one picked up with the second head), is called a head switching point.

If the heads are ideally switched, the obtained video signal should not include any noise caused by switching the heads. In practice, however, a gap or an overlap due to the head switching takes place in the video signal.

FIG. 1 (b) is a waveform diagram of a reproduced video signal. FIGS. 1 (a) and 1 (b) is depicted in accordance with the same time base. Referring to FIG. 1, a gap or an overlap takes place in the video signal at the head switching point. The gap or the overlap of the video signal appears on the reproduced picture as a video distortion called a skew.

The position of the head switching point depends on the rotating speed of the rotary drum and the tape running speed. The rotation of the rotary drum and the running of the tape are controlled so as to be substantially constant by an exclusively prepared servo system. The control of the servo system, however, includes jitters resulting in the constant fluctuation of the switching point.

A method for correcting a skew utilizing a field memory is disclosed in "ITEJ (Institute of Television Engineers of Japan) GIHO (Technical Report)" (Vol. 13, No. 50 October, 1989), pp. 7-9. The method is called "line shuffling".

According to the line shuffling method, a signal for one field is once stored in a field memory. The scan lines of the video signals stored in the field memory are extracted every predetermined number thereby forming one segment signal. The rest of the scan lines are also divided into other segment signals in the same manner. Each of the divided segment signals includes rough information over the entire picture, although the number of the scan lines included therein is insignificant. Each segment signal is stored on one track on a magnetic tape.

The above-mentioned article describes that a great improvement was provided to the reproduced picture, in case a signal for one field is divided and stored on a plurality of tracks by utilizing the shuffling method.

However, if thus trying to correct skews by utilizing a field memory, complicated circuitry is required. Furthermore, it is well known that the field memory is expensive, and such a use of the field memory will push up the cost of a product.

On the other hand, a method for correcting the time base shift of a reproduced video signal is disclosed in ITCJ GIHO (Vol. 35, No. 6 1981) pp. 37-44. The method detects a reference signal such as a horizontal synchronizing signal or a burst signal included in a video signal and shifts the time base on the detected signal.

The method, however, merely performs the time base shift of a video signal or the correction of jitters etc., and therefore, is irrelevant to skews appearing on a picture. The method cannot deal with the skews on the picture which are caused by the head switching at the time of reproducing.

SUMMARY OF THE INVENTION

An object of the present invention is, therefore, to provide a magnetic recording/reproducing apparatus having a simple circuit configuration, which is capable of removing from a video signal skews on a picture caused by the head switching.

A magnetic recording/reproducing apparatus in the present invention includes a plurality of magnetic heads attached on a rotary drum for recording a video signal on a magnetic tape by scanning the magnetic tape, and for picking up a video signal recorded on the magnetic tape, a driver for driving the rotary drum and the magnetic tape so that the relative speed between the magnetic heads and the magnetic tape is substantially constant, a head switching circuit for producing a single video signal by switching the video signals picked up by the plurality of magnetic heads, a video processing circuit for processing the video signal produced by the head switching circuit, and a head switching point control circuit for controlling the head switching circuit so that the point of switching the magnetic heads by the head switching circuit is included in the horizontal blanking period of the processed video signal.

In a magnetic recording/reproducing apparatus with the above-mentioned structure, the heads are switched in the horizontal blanking period of a video signal. Even if noise is caused in the video signal by switching the heads, the effect of the noise is limited within the horizontal blanking period. Consequently, no skew is caused in the reproduced picture by the head switching. No field memory is required for the removal of skews, and only a simple circuit is required.

In another aspect of the present invention, the magnetic recording/reproducing circuit further includes a drop out detection circuit for detecting drop out of a video signal reproduced from a magnetic tape and outputting a drop out detection pulse, and a compensation circuit for compensating for a part of the video signal using another part of the video signal, in response to the drop out detection signal.

In a magnetic recording/reproducing apparatus thus structured, even when a drop out takes place which is caused by a fault in a magnetic tape or a silt in the head, the part of the video signal is compensated for using another part of the video signal. Noise caused by a dropout which is undesirable for a reproduced video is not generated.

In accordance with a further aspect of the present invention, the magnetic recording/reproducing apparatus includes a pseudo drop out signal output circuit for outputting a pseudo drop out signal similar to a drop out detection signal, in synchronization with the switching of the magnetic heads by the head switching circuit, and a gate circuit for finding a logical product of the drop out detection signal and the pseudo drop out signal and applying the same to the compensation circuit.

In a magnetic recording/reproducing apparatus with the above-mentioned structure, when a skew is caused in a video signal by the head switching, a pseudo drop out signal is produced. The compensation circuit compensates not only for the drop out detection signal but also for the video signal at the point utilizing a video signal at another point in response to the pseudo drop out signal. Even if, by any chance, the head switching point cannot remain within the horizontal blanking period of the video signal due to jitters etc. of a servo system, a skew caused by the head switching can be removed from the reproduced video.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 2:
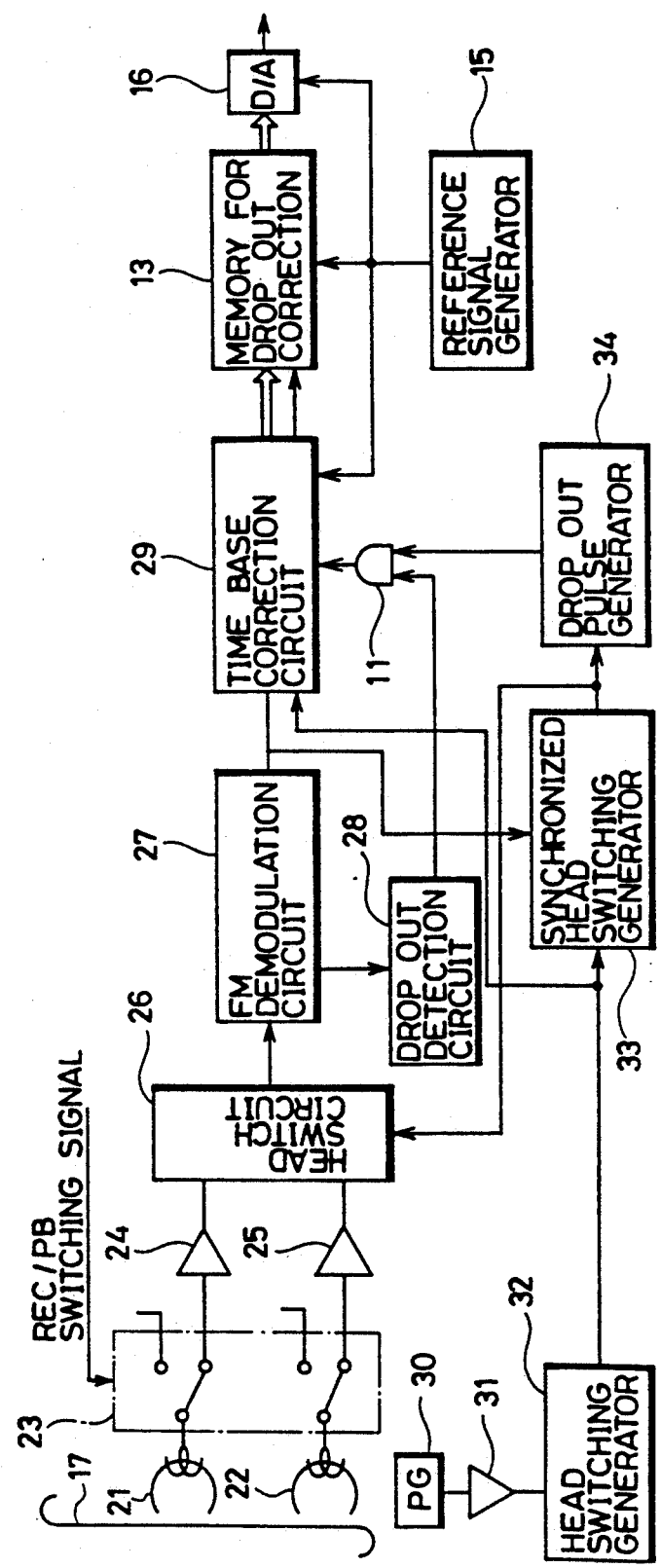
FIG. 2 is a circuit block diagram of a reproducing system of one embodiment of a magnetic recording/reproducing apparatus in accordance with the present invention.

Referring to FIG. 2, a reproducing system circuit of a magnetic recording/reproducing apparatus in accordance with the present invention includes two magnetic heads 21, 22 provided on the rotary drum (not shown) for picking up video signals recorded on a magnetic tape 17; a recording/reproducing switch 23 for switching the coupling of the magnetic heads 21, 22 with a recording system circuit and a reproducing system circuit in response to an externally applied recording/reproducing switching signal; amplifiers 24, 25 for amplifying each of the signals picked up by the magnetic heads 21, 22; a head switching circuit 26 with the inputs connected to the outputs of the amplifiers 24, 25 for selecting one of the outputs of the amplifiers 24, 25 and outputting the same in response to an externally applied head switching pulse; an FM demodulation circuit 27 with the input connected to the output of the head switching circuit 26 for FM demodulating the video signals picked up by the magnetic heads 21, 22 and applied from the head switching circuit 26; a drop out detection circuit 28 with the input connected to the output of the FM demodulation circuit 27 for outputting a drop out detection signal upon detecting that the level of the video signal output from the FM demodulation circuit 27 is below a prescribed threshold; a pulse generator (PG) 30 provided in association with the rotary drum (not shown) for outputting a pulse in synchronization with the rotation of the rotary drum, an amplifier 31 for amplifying the pulse output from the PG 30, a head switching generator 32 for generating a head switching signal representing the timing of the head switching based on the output of the amplifier 31, a synchronizing head switching generator 33 with the inputs connected to the output of the head switching generator 32 and the output of the FM demodulation circuit 27 for generating a synchronizing head switching pulse, the value of which changes from the first value to the second value and vise versa within the horizontal blanking period of the video signal, in response to a horizontal synchronizing signal included in the video signal output from the FM demodulation circuit 27 and to the head switching pulse applied from the head switching generator 32; a pseudo drop out pulse generator 34 with the input connected to the output of the synchronizing head switching generator 33 for generating a pseudo drop out pulse with a waveform similar to that of a drop out detection signal output from the drop out detection circuit in response to the synchronized head switching pulse output from the synchronizing head switching generator 33; an AND gate 11 with the two inputs connected to the outputs of the drop out detection circuit 28 and the pseudo drop out pulse generator 34, respectively; a time base correction circuit 29 for correcting time base shifts included in the video signal applied from the FM demodulation circuit 27, the head switching pulse applied from the head switching generator 32, the drop out detection pulse and the pseudo drop out pulse applied from the gate circuit 11 and for outputting the time-base-corrected, and digitized video signal as well as the drop out pulse (including the pseudo drop out pulse) with the time base corrected similarly; a memory 13 for dropout compensation for compensating for the dropped out part of the digital video signal applied from the time base correction circuit 29 in response to the drop out pulse applied from the same time base correction circuit 29; a D/A (Digital-to-Analogue) converter 16 for converting the digitized video signal output from the memory 13 for drop out compensation into an analogue signal; and a reference signal generator 15 for generating a reference signal for defining the operation timings of the time base correction circuit 29, the memory 13 for drop out compensation, and the D/A converter 16.

What should be noted in FIG. 2 is that a drop out detection signal output from the drop out detection circuit 28 and a pseudo drop out pulse output from the pseudo drop out pulse generator 34 are based on a negative logic. Only if the output of the drop out detection circuit 28 and the output of the pseudo drop out pulse generator 34 are both at their high levels, the AND gate 11 allows the output to be at its high level. The AND gate 11 therefore finds a logical product of the drop out detection pulse and the pseudo drop out pulse in a negative logic.

Figure 3:
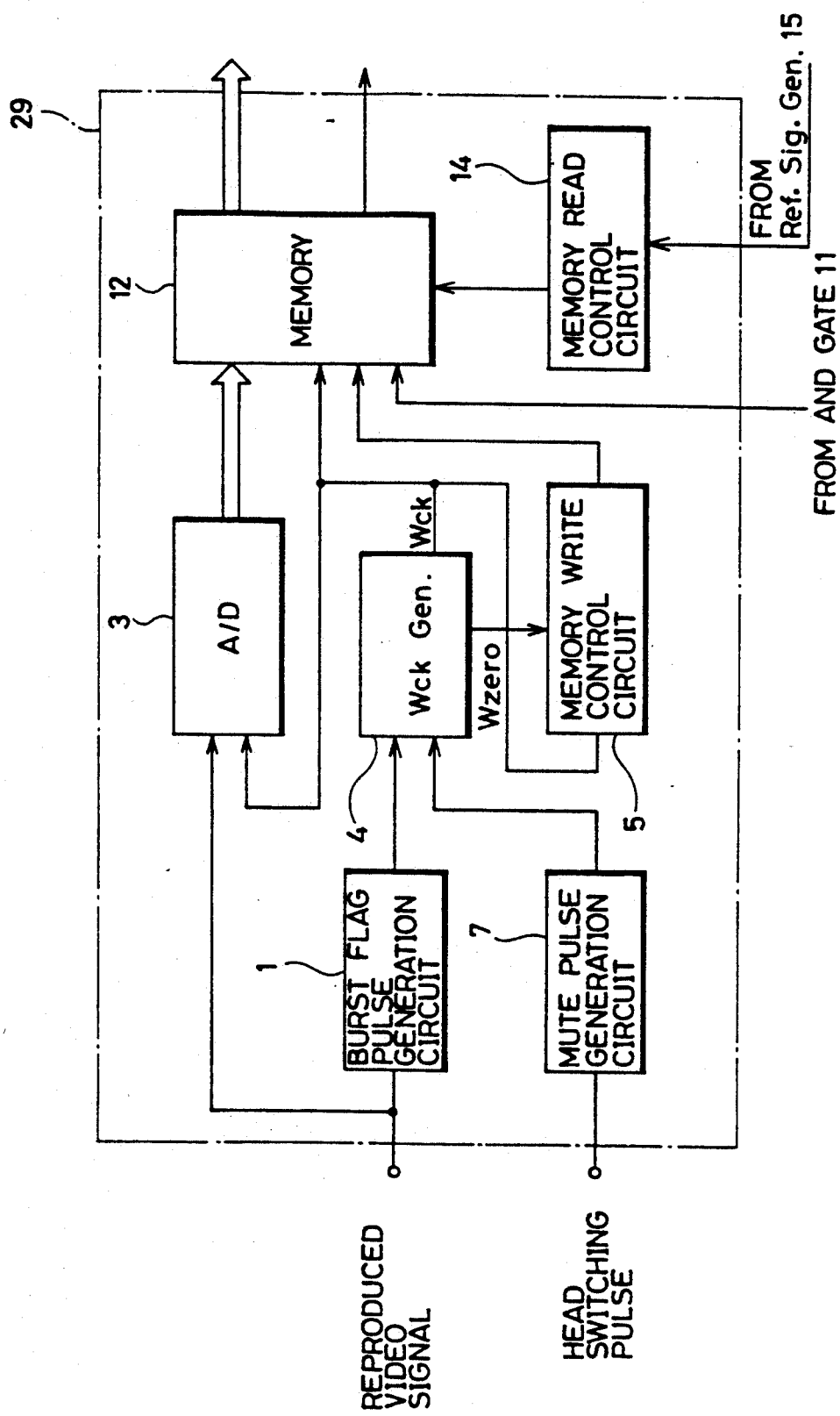
FIG. 3 is a block diagram of a time base correction circuit of the circuit shown in FIG. 2.

Referring to FIG. 3, the time base correction circuit 29 includes a burst flag pulse generation circuit 1 for detecting a burst signal from an input reproduced video signal and for generating a burst flag pulse; a mute pulse generation circuit 7 for generating a mute pulse in response to a head switching pulse applied from the head switching generator 32; a write clock signal generator 4 for generating a write clock signal Wck following the reproduced video signal including a time base shift and a pulse Wzero representing the start timing of the signal writing into the memory in response to the burst flag pulse applied from the burst flag pulse generation circuit 1 and the mute pulse applied from the mute phase generation circuit 7; a memory write control circuit 5 for controlling the writing of the signal into the memory which is described later in response to the write clock signal Wck and the write start pulse Wzero applied from the write clock generator 4, and A/D converter 3 operating in synchronization with the write clock signal Wck for A/D converting the reproduced video signal, a memory 12 controlled by the memory write control circuit 5 for storing a digitized video signal applied from the A/D converter 3 in synchronization with the write clock signal Wck as well as storing a drop out detection signal applied from the AND gate 11 similarly, and outputting a video signal and a drop ut detection signal in synchronization with an applied read clock signal; and a memory read control circuit 14 for generating a read clock signal defining the read timing of the signal from the memory 12 in synchronization with a reference signal applied from a reference signal generator 15.

Figure 1:
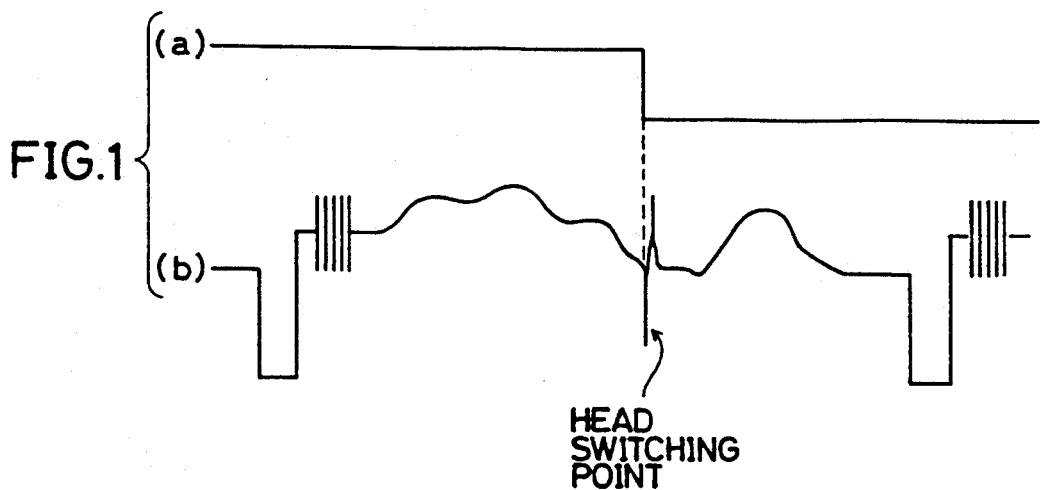
FIG. 1 is a timing diagram showing the timing of the head switching by a conventional magnetic recording-/reproducing apparatus.
Figure 4:
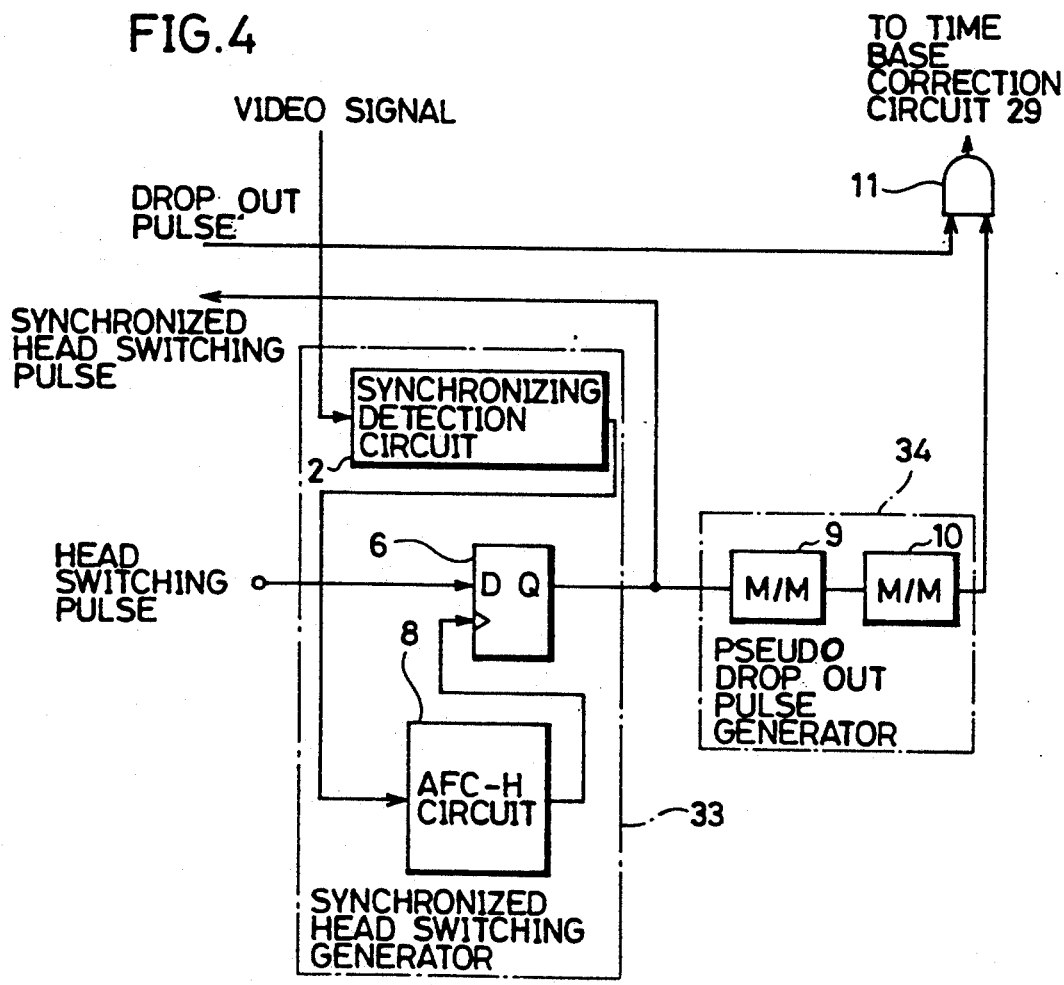
FIG. 4 is a block diagram of a synchronizing head switching generator and a pseudo drop out pulse generator shown in FIG. 2.

Referring to FIG. 4, the synchronizing head switching generator 33 includes a synchronizing detection circuit 2 for extracting a horizontal synchronizing signal from the reproduced video signal applied from the FM demodulation circuit 27; and AFC (Auto-Frequency Control) -H circuit 8 for generating a signal of a stable cycle having the same cycle as that of the horizontal synchronizing signal detected by the synchronizing signal detection circuit 2, and a latch circuit 6 for latching a head switching pulse in synchronization with the signal applied from the AFC-H circuit 8 and outputting the same as a synchronized head switching pulse.

The pseudo drop out pulse generator 34 includes a monostable multivibrator (M/M) 9 with the input connected to the output of the latch circuit 6 for generating a pulse having a prescribed width in response to a change in the signal level of the synchronized head switching pulse, and an M/M 10 with the input connected to the M/M 9 for generating a pseudo drop out pulse having a pulse width of a constant time in response to a change in the level of the signal output from the M/M 9. The output of the M/M 10 is connected to one of the inputs of the AND gate 11.

Figure 5:
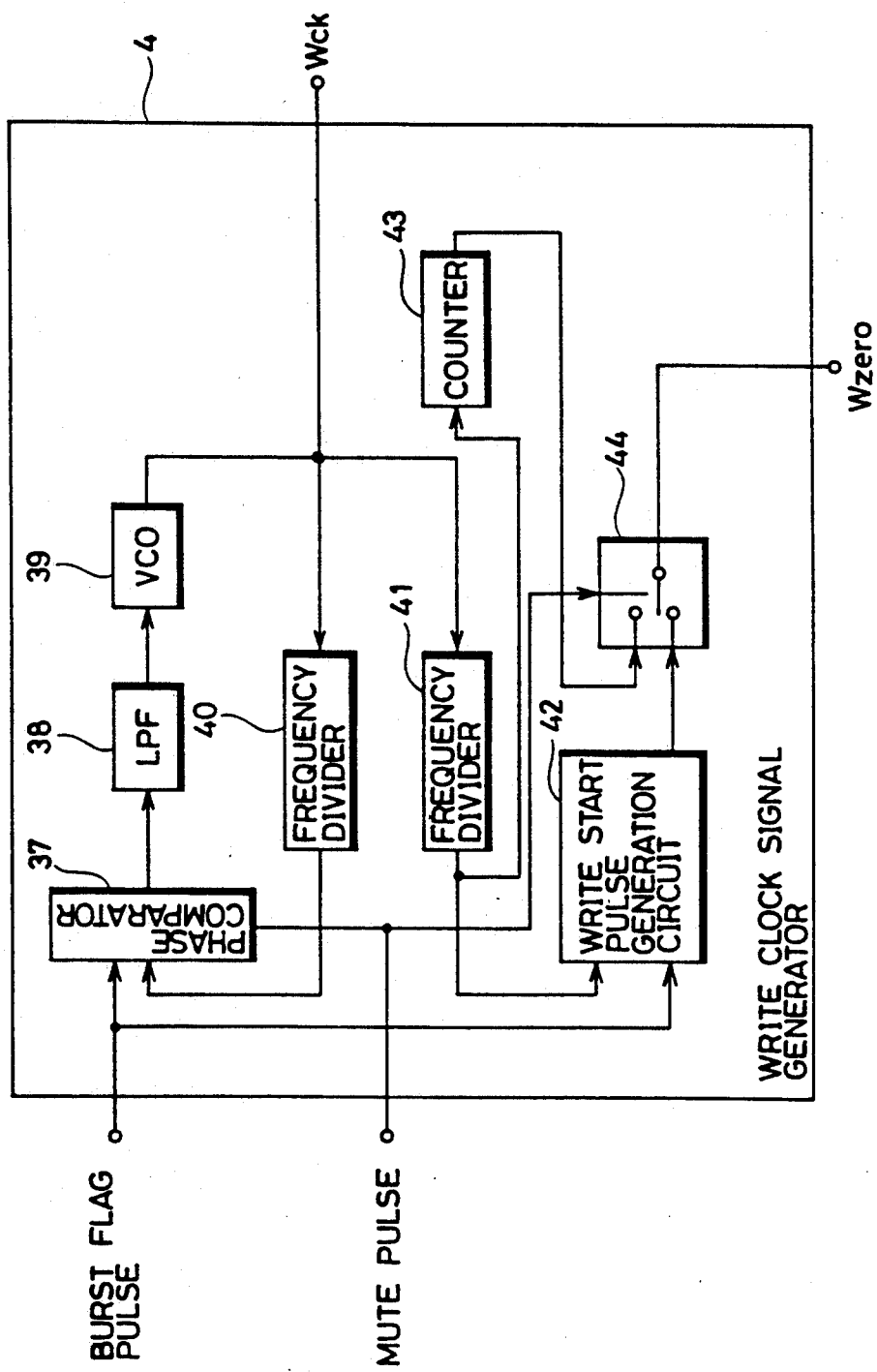
FIG. 5 is a block diagram of a write clock signal generator.

Referring to FIG. 5, the write clock signal generator 4 includes a phase comparator 37; an LPF (Low-Pass Filter) 38; a voltage control oscillator (VCO) 39; a frequency divider 40 for dividing the output of the VCO 39 at a prescribed division value; another frequency divider 41 for dividing the output of the VCO 39 at a prescribed division value; a write start pulse generation circuit 42 for generating a write start pulse Wzero for designating the timing to start writing video signal data into the memory 12 in response to the outputs of the burst flag pulse and the frequency divider 41; a counter 43 with the input connected to the output of the frequency divider 41 for generating a pseudo write start pulse based on the output of the frequency divider 41; and a switch 44 for outputting the output of the write start pulse generation circuit 42 usually and the output of the counter 43 when a mute pulse is applied, as a write start pulse Wzero.

The output of the phase comparator 37 is connected to the input of the LPF 38. The output of the LPF 38 is connected to the input of the VCO 39. The output of the VCO 39 is connected to the frequency dividers 40, 41. The output of the frequency divider 40 is connected to the phase comparator 37. That is, the phase comparator 37, the LPF 38, the VCO 39, and the frequency divider 40 formed a PLL (Phase-Locked Loop) circuit. The output of the VCO 39 is applied to the memory 12 and the memory write control circuit 5 as a write clock signal Wck.

The phase comparator 37 compares the phase between the burst flag pulse and the output of the frequency divider 40. The PLL circuit operates so that the write clock signal Wck output from the VCO 39 follows the burst flag pulse including the time base shifts. The phase comparator 37 discontinues the phase comparison in response to a mute pulse and outputs a signal with a value same as that of the signal immediately before the discontinuation during this time.

As mentioned above, the write clock signal Wck output from the write clock signal generator 4 follows the phase of the reproduced video signal including the time base shift. The write start pulse Wzero output from the write clock signal generator 4 is also a signal generated usually based on a burst flag pulse. In case the head switching is carried out and the mute pulse is input into the write clock signal generator 4, however, a write start pulse Wzero 1H (horizontal scanning period) before is output.

The write clock signal generator is configured as mentioned above in order to prevent the PLL circuit from becoming unstable at the time of the head switching. The write clock signal generator 4 is able to generate stable write clock signal Wck and write start pulse Wzero, even in case a rapid phase shift is caused in a reproducing video signal due to a skew cause at the time of the head switching.

Referring to FIGS. 2 to 6, the reproducing system circuit of the magnetic recording/reproducing apparatus in accordance with the present invention operates as follow. Referring especially to FIG. 2, the recording/reproducing switch 23 responds to an externally applied signal and connects the heads 21, 22 and the amplifiers 24, 25, respectively. The heads 21, 22 scan the tape 17 alternately, pick up video signals stored in the magnetic tape 17, and apply the signals to the amplifiers 24, 25. The amplifiers 24, 25 each amplify the outputs of the heads 21, 22 and apply them to the head switching circuit 26.

The head switching circuit 26 selects the outputs of the amplifier 24 and the amplifier 25 alternately and produces one reproduced video signal in response to a synchronized head switching pulse applied from the synchronized head switching generator 33 and apply the signal to the FM demodulation circuit 27. The FM demodulation circuit 27 FM-demodulates the input video signal and apply the same to the time base correction circuit 29 and the synchronized head switching generator 33. The signal representing the level of the reproduced video signal applied to the FM demodulation circuit 27 is applied to the drop out detection circuit 28.

In case the level of the reproduced video signal input to the FM demodulation circuit 27 drops below a prescribed threshold, the drop out detection circuit 28 detects that a part of the video signal has dropped out and applies a drop out detection signal to the AND gate 11.

The PG 30 generates a pulse synchronized with the rotation of the rotary head and applies the same to the amplifier 31. The amplifier 31 amplifies the pulse generated from the PG 30 and apply the same to the head switching generator 32. The head switching generator 32 generates a head switching pulse representing the timing of switching the heads which is in synchronization with the rotation of the rotary head, based on the output of the amplifier 31 and applies the pulse to the synchronized head switching generator 33.

Referring to FIG. 4, the synchronized head switching generator 33 operates as described below. The synchronizing detection circuit 2 extracts a horizontal synchronizing signal from the video signal and applies the same to the AFC-H circuit 8. The AFC-H circuit 8 produces a signal of a stable frequency having a cycle identical to that of the detected horizontal synchronizing signal and applies the signal to the clock terminal of the latch circuit 6. The detected horizontal synchronizing signal is not directly applied to the clock terminal of the latch circuit 6 because there exists a possibility that a synchronizing signal is detected in a wrong timing due to waveform distortion etc. caused by the head switching. By inserting the AFC-H circuit 8 inbetween, the frequency of the clock signal applied to the latch circuit 6 will be stable.

The latch circuit 6 latches the value of the head switching pulse to be input in a timing defined by the signal applied from the AFC-H circuit 8. That is, the output of the latch circuit 6 synchronizes with the rising of the pulse applied from the AFC-H circuit 8 and changes its level. The head switching pulse output from the latch circuit 6 is therefore generated in the same timing as the one in which the horizontal synchronizing signal of the video signal is generated.

On the other hand, the output of the latch circuit 6 is also applied to the M/M 9. The M/M 9 responds to the synchronized head switching pulse and applies a pulse having a constant pulse width to the M/M 10. The M/M 10 also responds to the output of the M/M 9 and applies a pseudo drop out pulse of a constant pulse width to the AND gate 11.

Figure 6:
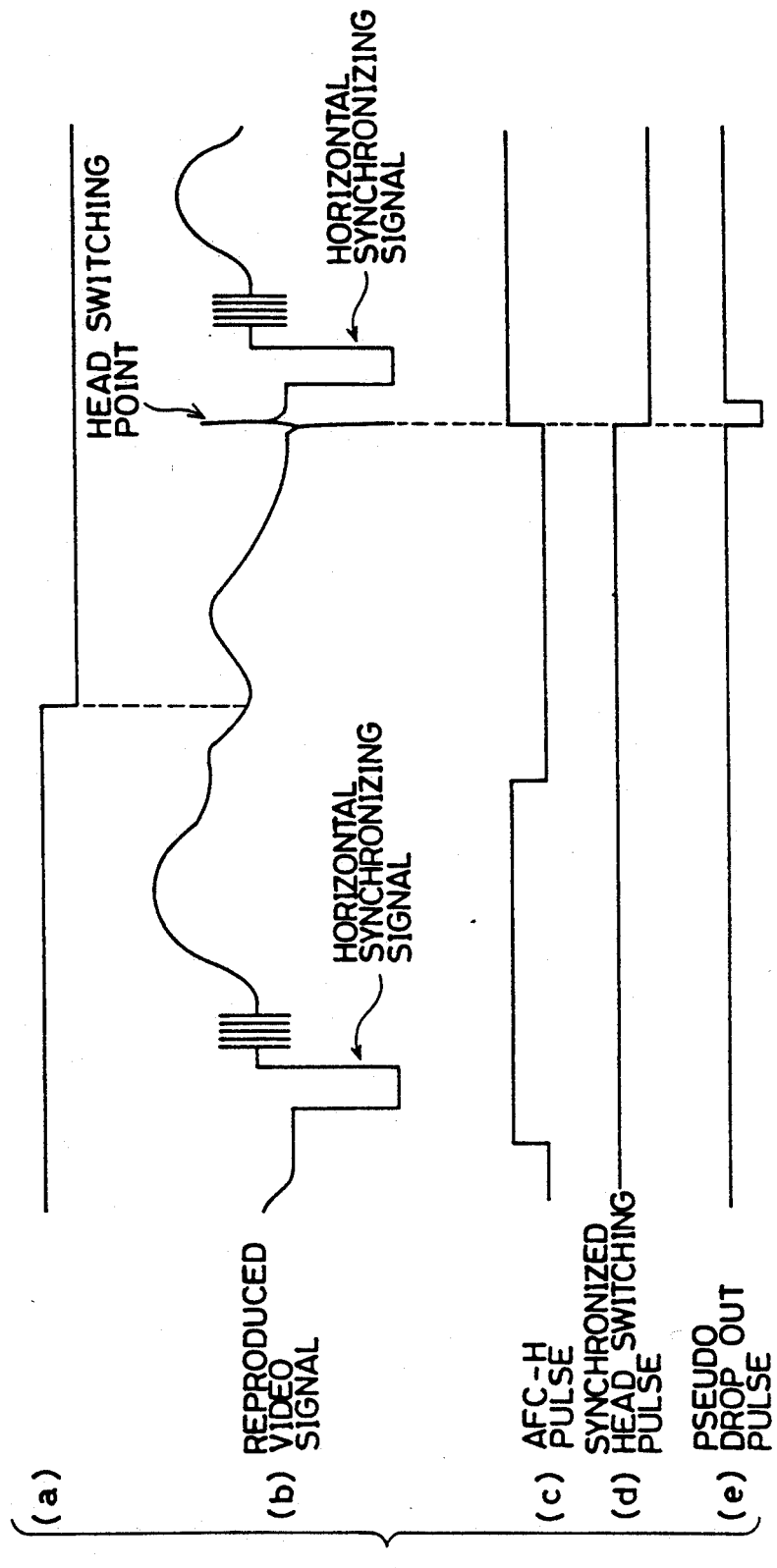
FIG. 6 is a waveform diagram showing the operation of the magnetic recording/reproducing apparatus in accordance with the present invention shown in FIG. 2.

Referring again to FIG. 6, the operation of the synchronized head switching generator 33 and the pseudo drop out pulse generator 34 will be described. As shown in FIG. 6 (a), suppose that the level of a head switching pulse is changed within 1H of a video signal. As shown in FIG. 6 (c), the AFC-H circuit 8 produces a pulse having a cycle identical to that of the horizontal synchronizing signal of the video signal (FIG. 6 (b)) and applies the pulse to the latch circuit 6.

The latch circuit 6 latches the head switching pulse of the FIG. 6 (a) in a timing defined by the rising edge of the AFC-H pulse of FIG. 6 (c). As a result, the synchronized head switching pulse output from the latch circuit 6 has its level changed in the horizontal blanking period of the video signal, as shown in FIG. 6 (d).

A pseudo drop out pulse output from the pseudo drop out pulse generator 34 is applied to the AND gate 11 in a timing defined by the edge of the synchronized head switching pulse, as shown in FIG. 6 (e).

Referring to FIG. 3, the time base correction circuit 29 operates as mentioned below. A reproduced video signal output from the FM demodulation circuit 27 is applied to the burst flag pulse generation circuit 1 and the A/D converter 30. The burst flag pulse generation circuit 1 extracts a burst signal from the applied reproduced video signal and outputs a burst flag pulse based thereon. The burst flag pulse is applied to the write clock signal generator 4. The mute pulse generation circuit 7 generates a mute pulse based on a head switching pulse applied from the head switching generator 32 and applies the same to the write clock signal generator 4.

Referring to FIG. 5, the write clock signal generator 4 operates as described below. The phase comparator 37 compares the phases of a burst flag pulse including a time base shift and the output of the frequency divider and applies the error signal to the LPF 38. The LPF 38 transforms the error signal applied from the phase comparator 37 into a DC voltage. The VCO 39 responds to the DC voltage representing the error and changes its oscillation frequency. The output of the VCO 39 is once again applied to the phase comparator 37 via the frequency divider 40.

As mentioned above, the phase comparator 37, the LPF 38, the VCO 39, and the frequency divider 40 form a PLL circuit, and the write clock signal Wck output from the VCO 39 has a phase and a frequency both matching the burst pulse including the time base shift, which is applied to the phase comparator 7.

The write start pulse generation circuit 42 generates a write start pulse Wzero based on the signal produced by dividing a burst flag pulse and a write clock signal Wck by the frequency divider 41 and applies the same to one of the input terminals of the switch 44. The switch 44 usually applies the output of the write start pulse generation circuit 42 to the memory write control circuit 5 (FIG. 3) as a write start pulse Wzero.

When a mute pulse is applied from the mute pulse generation circuit 7 based on a head switching pulse, the write clock signal generator 4 operates as described below. The phase comparator 37 discontinues the comparison of the phases of a burst flag pulse and the output of the frequerncy divider 40 and keep the state 1H before. The switch 44, in response to the mute pulse, selects the output of the counter 43 and outputs as a write start pulse Wzero. The phase comparator 37 keeping the state 1H before, the output of the counter 43 is a pseudo write start pulse determined by the burst flag pulse 1H before. Although the pseudo write start pulse is different from the write start pulse which should be originally generated from the write start pulse generation circuit 42, being 1H before, the pulse would not include an error sufficient to affect the video signal significantly.

Referring again to FIG. 3, the write clock signal Wck output from the write clock signal generator 4 is applied to the A/D converter 3, the memory 12, and the memory write control circuit 5. The write start pulse Wzero is applied to the memory write control circuit 5.

The A/D converter 3 digitizes the video signal and applies the same to the memory 12 in a timing determined by the write clock signal Wck. The memory write control circuit 5 controls and starts the memory 12 to store the output of the A/D converter 3, in response to a white start pulse Wzero. The memory 12 stores in turn the outputs of the A/D converter 3 in a timing determined by the write clock signal Wck.

The write clock signal Wck and the write start pulse Wzero include the same time base shift as that of the reproduced video signal. When the reproduced video signal is written into the memory 12 in the timing defined by the clock signal Wck, the time base shift is removed from the reproduced video signal written in the memory 12.

The memory read control circuit 14 generates a read clock signal of a stable frequency in response to a reference signal of a constant frequency applied from the reference signal generator 15 and applies the same to the memory 12. Reproduced video signals are read out in turn from the memory 12 in synchronization with the read clock signal. The reproduced video signal output from the memory 12 scarcely includes a time base shift.

A drop out detection signal output from the AND gate 11 is also input into the memory 12. The drop out detection signal is written into the memory 12 by a write clock signal including a time base shift in the same manner as the reproduced video signal and read out from the memory 12 by a read clock signal having a constant frequency. The drop out detection signal is also produced from the reproduced video signal as mentioned above and includes a time base shift same as the one in the reproduced signal. Consequently, the time base shift can be removed from the drop out detection signal by performing the write in into the memory 12 and the read out of the memory 12 in the same manner as those of the reproduced video signal.

Referring again to FIG. 2, a digital reproduced video signal output from the time base correction circuit 29 and a drop out detection signal are applied to the memory 13 for drop out compensation. The memory 13 for drop out compensation includes a line memory and stores in turn digital reproduced video signals to be input. The memory 13 for drop out compensation usually applies in turnthe stored reproduced video signals to the D/A converter 16.

The memory 13 for drop our compensation, however, in case a drop out detection pulse is input, replaces a part of the video signal corresponding to the drop out detection pulse with a signal obtained by interpolating the signals before and after the part. Signals in the adjacent horizontal scan lines of video signals correlate to each other, and therefore, a signal obtained by such an interpolation is approximately equal to the original signal.

A digital reproduced signal output from the memory 13 for drop out compensation is converted into an analogue signal by the D/A converter 16 and applied to the outside.

If a usual drop out takes place, the drop out detection circuit 28 applies a drop out detection signal to the AND gate 11. The AND gate 11, in a negative logic, sets the logical product of the two inputs to be the output. The drop out detection signal is therefore applied to the time base correction circuit 29 and the memory 13 for drop out compensation from the AND gate 11 and the part of the video signal from which the drop out is detected is replaced with a signal obtained by interpolating the video signals before and after the part of the signal.

On the other hand, if a synchronized head switching pulse is output from the synchronized head switching generator 33, the pseudo drop out pulse generator 34 applies a pseudo drop out pulse to the AND gate 11. In the same manner as the drop out detection pulse, the pseudo drop out pulse is applied to the memory 13 for drop out compensation via the AND gate 11 and the time base correction circuit 29. The memory 13 for drop out compensation responds to the pseudo drop out pulse and replace the video signal corresponding to the point at which the pseudo drop out pulse is detected with a signal obtained by interpolating the video signals before and after the point. When the heads are switched, the part of the video signal in which the heads are switched is replaced with a signal obtained by interpolating the video signals before and after the point.

As mentioned above, by performing drop out compensation utilizing a pseudo drop out pulse, effects described below will be obtained. The head switching timing, as mentioned above, constantly changes due to the jitters of a servo system etc. If the head switching point is included within the horizontal blanking period, a skew due to the head switching is not caused in a reproduced video. However, it is not easy to keep the head switching in the horizontal blanking period all the time. When the head switching is caused in the part of a video signal other than in the horizontal blanking period, there is a possibility that a skew is caused in the video of the part.

However, by generating a pseudo drop out pulse in a timing identical to that of the head switching, the video signal at the point the head switching is carried out can be replaced with a signal obtained by interpolating the preceding and succeeding video signals. Also in this case, therefore, no significant skew is caused in the picture.

As mentioned above, in one preferred embodiment of the magnetic recording/reproducing apparatus in accordance with the present invention, the synchronizing head switching generator 33 and especially the AFC-H circuit 8 control the phase of the head switching pulse so that the head switching point is included within 1H blanking period of the reproduced vide signal. As a result, a skew due to the head switching would be absorbed in the horizontal blanking period. Even if the head switching is performed during the period other than the horizontal blanking period due to the jitters, etc. of the servo system and a skew is generated in the video signals of that part, that part of the video signals is interpolated by the preceding and scceeding video signals by providing the pseudo drop out pulse generator 34. Consequently, no skew is caused in the reproduced video by the head switching.

The method itself is well known, in which the drop out part of a video signal is interpolated utilizing a memory for drop out compensation in response to a drop out detection signal detected by a drop out detection circuit. The magnetic recording/reproducing apparatus in accordance with the present invention removes skews caused by the head switching utilizing the existing means for drop out compensation. Since there is no necessity for providing any new correction circuit, the circuit of the magnetic recording/reproducing apparatus in accordance with the present invention will be simple. Furthermore, the magnetic recording/reproducing apparatus in accordance with the present invention does not require a field memory.

Therefore, by applying the present invention to a magnetic recording/reproducing apparatus for recording video signals by scanning a magnetic tape helically, and especially to a magnetic recording/reproducing apparatus for recording/reproducing video signals of 1 field by dividing them into a plurality of segments, a good reproduced video image without a skew can be obtained.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A magnetic recording/reproducing apparatus, comprising:
    a plurality of magnetic means attached on the circumference of a rotary drum for recording video signals on a magnetic tape and picking up the video signals recorded on the magnetic tape by scanning the magnetic tape;
    means for driving said rotary drum and said magnetic tape so that the relative speed of said magnetic means and said magnetic tape is substantially constant;
    switching means for producing one video signal by switching the video signals picked up by said plurality of magnetic means;
    means for processing the one video signal produced by said switching means;
    switching point control means for controlling said switching means so that the switching point of said magnetic means by said switching means is included in a horizontal blanking period of said processed video signal;
    drop out detection means for outputting a drop out detection pulse by detecting the drop out of said video signal reproduced from said magnetic tape,
    compensation means responsive to said drop out detection signal for compensating for a part of said video signal utilizing said video signal preceding and succeeding the period,
    pseudo drop out signal output means for outputting a pseudo drop out signal similar to said drop out detection signal in synchronization with the switching of said magnetic means by said switching means; and
    gate means for finding a logical product of said drop out detection signal and said pseudo drop out signal and applying it to said compensation means.

2. The magnetic recording/reproducing apparatus according to claim 1, further comprising time base correction means for correcting the time base shifts included in outputs of said video signals and said gate means.

3. The magnetic recording/reproducing apparatus according to claim 2, wherein said time base correction means comprises:
    burst flag pulse generation means for detecting the burst signals of said video signal and generating a burst flag pulse;
    PLL means responsive to said burst flag pulse for outputting a first clock signal including a time base shift identical with said time base shift of said video signals;
    means responsive to changes in the values of said reference switching signal for temporarily restricting said PLL means to follow the time base shift of said video signals; and
    storage means for storing said video signal in synchronization with said first clock signal.

4. The magnetic recording/reproducing apparatus according to claim 3, further comprising:
    write start pulse generation means responsive to said burst flag pulse and said first clock signal for generating a write start pulse for defining the start timing of writing said video signals into said write means;
    pseudo start pulse generation mean responsive to said first clock signals for generating a pseudo start pulse in a prescribed relation with said first clock signal;
    switching means for usually selecting the output of said write start pulse generation means, selecting the output of said pseudo start pulse only in a predetermined period of time in response to a change in the value of said reference switching signal, and applying the output to said storage means as a signals defining the write start timing of said video signal.

5. A magnetic recording/reproducing apparatus, comprising:
    a plurality of magnetic means attached on the circumference of a rotary drum for recording video signals on a magnetic tape and picking up the video signals recorded on the magnetic tape by scanning the magnetic tape;
    means for driving said rotary drum and said magnetic tape so that the relative speed of said magnetic means and said magnetic tape is substantially constant;
    switching means for producing one video signal by switching the video signals picked up by said plurality of magnetic means;
    means for processing the one video signal produced by said switching means;
    switching point control means for controlling said switching means so that the switching point of said magnetic means by said switching means is included in a horizontal blanking period of said processed video signal;
    said switching point control means comprises:
    reference switching signal output means for outputting a reference switching signal which takes a first and a second values alternately in a cycle identical with that of the switching of said magnetic means in synchronization with the rotation of said rotary drum;
    means for outputting a first signal with a frequency and a phase identical with a frequency and phase of a horizontal synchronizing signal included in said one video signal; and
    means for latching the value of said reference switching signal in a timing determined based on said first signal,
    wherein said means for outputting the first signal comprises:
    horizontal synchronizing signal detection means for detecting the horizontal synchronizing signal included in said video signals;
    an AFC-H circuit for outputting a signal of a stable frequency having a phase identical to the phase of the horizontal synchronizing signal detected by said horizontal synchronizing signal detection means and having a frequency identical to the frequency of the horizontal synchronizing signal detected by said horizontal synchronizing signal detection circuit.

* * * * *